(12) United States Patent
Kerschner et al.

(10) Patent No.: US 8,321,330 B2
(45) Date of Patent: Nov. 27, 2012

(54) PRECIOUS METAL BULLION ARBITRAGE RETAIL KIOSK AND ASSOCIATED METHODS OF USE AND MANUFACTURE

(75) Inventors: Michael B. Kerschner, Puyallup, WA (US); Donald L. Gardner, Gig Harbor, WA (US)

(73) Assignee: Security Pacific Capital Corporation, Seattle, WA (US)

( * ) Notice: Subject to any disclaimer, the term of this patent is extended or adjusted under 35 U.S.C. 154(b) by 193 days.

(21) Appl. No.: 12/858,165

(22) Filed: Aug. 17, 2010

(65) Prior Publication Data

US 2011/0047062 A1 Feb. 24, 2011

Related U.S. Application Data

(60) Provisional application No. 61/234,404, filed on Aug. 17, 2009.

(51) Int. Cl.
G06Q 40/00 (2012.01)
(52) U.S. Cl. .......................................................... 705/37
(58) Field of Classification Search ............... 705/35–45
See application file for complete search history.

(56) References Cited

U.S. PATENT DOCUMENTS

| | | | |
|---|---|---|---|
| 7,693,751 B2 * | 4/2010 | Aronson ................... 705/26.41 |
| 7,844,547 B2 * | 11/2010 | Amos .............................. 705/43 |
| 2002/0138396 A1 * | 9/2002 | Brown et al. .................... 705/37 |
| 2003/0084596 A1 * | 5/2003 | Zurawski et al. .............. 40/27.5 |
| 2006/0095346 A1 * | 5/2006 | Gambhir ......................... 705/28 |
| 2006/0265288 A1 * | 11/2006 | Aronson ......................... 705/26 |
| 2007/0038523 A1 * | 2/2007 | Komem et al. ................. 705/26 |
| 2009/0063344 A1 * | 3/2009 | Travis et al. .................... 705/43 |
| 2009/0070236 A1 * | 3/2009 | Cohen et al. ................... 705/27 |
| 2009/0106140 A1 * | 4/2009 | De La Motte ................... 705/37 |
| 2009/0125435 A1 * | 5/2009 | Cohen et al. ................... 705/37 |
| 2009/0192938 A1 * | 7/2009 | Amos .............................. 705/43 |
| 2012/0066097 A1 * | 3/2012 | Amos .............................. 705/28 |

OTHER PUBLICATIONS

Evans, Richard; Wallop, Harry, "Now you can buy gold bars at a vending machine",The Daily Telegraph. London (UK): Jun. 20, 2009, pp. 1-2.*

Evans, Richard; Wallop, Henry, "Now you can buy gold bars at a vending machine", The Daily Telegraph. London (UK): Jun. 20, 2009. p. 2.*

Fakuda, H.,"Guide to gold: Gold—The ultimate currency", Euromoney, Apr. 2002, iss. 396, pp. s1-s11.*

Karmin C, "'Gold Bugs' in the System of Electronic Payments Are Bullish on Bullion; Mr. Turk and Others Buy into Plan to Replace Currency in Transactions", Wall Street Journal, Oct. 10, 2005, p. A.1.*

* cited by examiner

*Primary Examiner* — Ella Colbert
*Assistant Examiner* — Mohammad Z Shaikh
(74) *Attorney, Agent, or Firm* — Timothy E Siegel Patent Law, PLLC; Timothy E Siegel

(57) ABSTRACT

Embodiments of the present disclosure are directed towards a bullion arbitrage kiosk portal device that enables a customer to buy and/or sell precious metal bullion. A price for the bullion is dynamically determined based at least in part on a plurality of real-time market quotes, an operational markup, and an inventory determination of bullion at a single or multiple number of kiosk portal device(s). The kiosk portal device is further configured such that bullion purchased by the kiosk portal device may be resold by the same kiosk portal device, thereby integrating the buy/sell of bullion, even by the same customer. The kiosk portal device further enables a customer to exchange bullion for differing configurations and/or amounts of other bullion, as well as other forms of payment, such as cash, credit, or alternative denominations of bullion.

23 Claims, 9 Drawing Sheets

PRECIOUS METAL BULLION ARBITRAGE RETAIL KIOSK AND ASSOCIATED METHODS OF USE AND MANUFACTURE

CROSS-REFERENCE TO RELATED APPLICATIONS

The present application claims priority to, and incorporates by reference herein in its entirety, U.S. Provisional Application No. 61/234,404, filed Aug. 17, 2009, entitled BULLION ARBITRAGE RETAIL KIOSK, by inventors Michael B. Kerschner and Donald L. Gardner.

TECHNICAL FIELD

The disclosure is directed generally to bullion transaction systems and, more particularly, to systems and kiosk portal devices for enabling sale and purchase of gold bullion or other precious metals, including re-sale and/or re-purchase of bullion from the same portal device.

BACKGROUND

Gold is frequently considered to be a popular investment. Investors generally buy gold as a hedge or safe haven against any economic, political, social, or currency-based crises. These crises include investment market declines, inflation, war, and social unrest. Investors also buy gold during times of a bull market in an attempt to gain financially.

From the times of ancient Egyptians, owning gold has been favored as a way to create and to preserve personal wealth. Gold has been known as providing unique advantages over other forms of currency, such as money. Such advantages are inherent to gold, and typically are not found in other forms of currency. For example, gold may be viewed as a consistent unit of account. An ounce of gold remains the same today as it did a hundred years ago. However, sovereign currencies the world over, fiat in nature, are based on the financial strength and credit worthiness of the issuer government and cannot make such a claim. In fact, the one common characteristic of all fiat currencies is that they virtually all have failed to maintain their purchasing power parity over time. For example a U.S. dollar issued in 1913 by the Federal Reserve is worth about just 2 cents in today's market, having lost about 98% of its value. Although a standard form of currency is necessary for trade and commerce in a modern economy, it none the less remains a very poor store of value. The U.S. dollar, Japanese Yen, or even the Swiss Franc that may be deposited in one bank may not be the same as the same currency deposited in a different bank. This may be the case, for example, due to differing levels of capital, mixes of assets, or the like, by the two banks.

Moreover, currency also carries counter-party risk whereas gold bullion has none. Holders of currency are not only exposed to the risk of default from a national crisis, but also to the solvency of the bank holding their deposit. In the US, an attempt to overcome the bank solvency risk is mitigated by insuring deposits at member banks through the Federal Deposit Insurance Corporation (FDIC.) However, the insurance is often limited and the coverage changes at the whim of the government. Additionally, the funds established for this insurance may sometimes be insufficient to cover the losses it was developed to mitigate. Therefore, holding currency carries counter-party risk on several levels, whereas gold bullion, upon its physical possession, has none.

However, determining when any given bank is unable to meet their commitments to their clients to return the client's currency is extremely difficult. Therefore, currency remains at risk. Similar risks also arise with other forms of wealth investments, including stocks and bonds. Investments in various companies through stocks and bonds may simply evaporate virtually overnight, leaving an investor drained of funds. Savings of a particular national currency may also be at risk based on the general economy of that nation, civil unrest, war, or the like.

Thus, many people have recognized that gold or similar precious metals may be a preferred form for wealth preservation. While gold could be purchased through gold certificates, many certificates were typically held by a broker. Such retention often meant that the consumer could not readily negotiate sales or purchases except through the broker. And worse, should the brokerage fail, access to the certificate might become difficult if not impossible. Therefore, many people prefer to maintain possession of their purchased gold. However, until Dec. 31, 1974, the purchasing of gold bullion had been restricted to numismatists and jewelers.

Purchases of bullion through retailers such as jewelers, coin shops, or collectors often means that price negotiations are at the whim of the retailer. Consistency in pricing retail bullion between merchants, however, is often seen as nonexistent and haphazard at best. Other than the international commodities markets where wholesale spot market pricing is determined, there is little effort to mainstream the consumer's understanding of the resale bullion market for consistency or reliability in pricing. Most retail consumers of bullion rely on a successful negotiation at the point of purchase before consummating a purchase of bullion, thereby often walking away unsatisfied, without a purchase, or sale, because of unscrupulous merchant practices or constantly changing pricing schemes. Additionally, the ability to access the retailer may be restricted to certain business hours. Thus, the consumer often must make their purchases or sales during business hours, even though a market price might be better for the consumer at some other time of day or night. Moreover, the retailer, might draw out the purchases of gold until he can make a profit, negotiating purchases of gold with the consumer that may result in significant loses of wealth by the consumer. Each year the courts are burdened with such complaints. Therefore, many consumers seek another way of purchasing bullion that provides ready access to the market, thereby enabling the consumer to take advantage of market value changes in the price of gold.

In addition, many consumers wishing to own gold, silver or other commodities would prefer not to have their identity well known by others, such as jewelers or retailers. This anonymity allows the consumer to sell, or buy, without friends, neighbors, retailers, or others becoming "aware" of their possessions. Such anonymity may be important in providing a meaningful level of safety and security to the consumer. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

DETAILED DESCRIPTION

Figure 1:
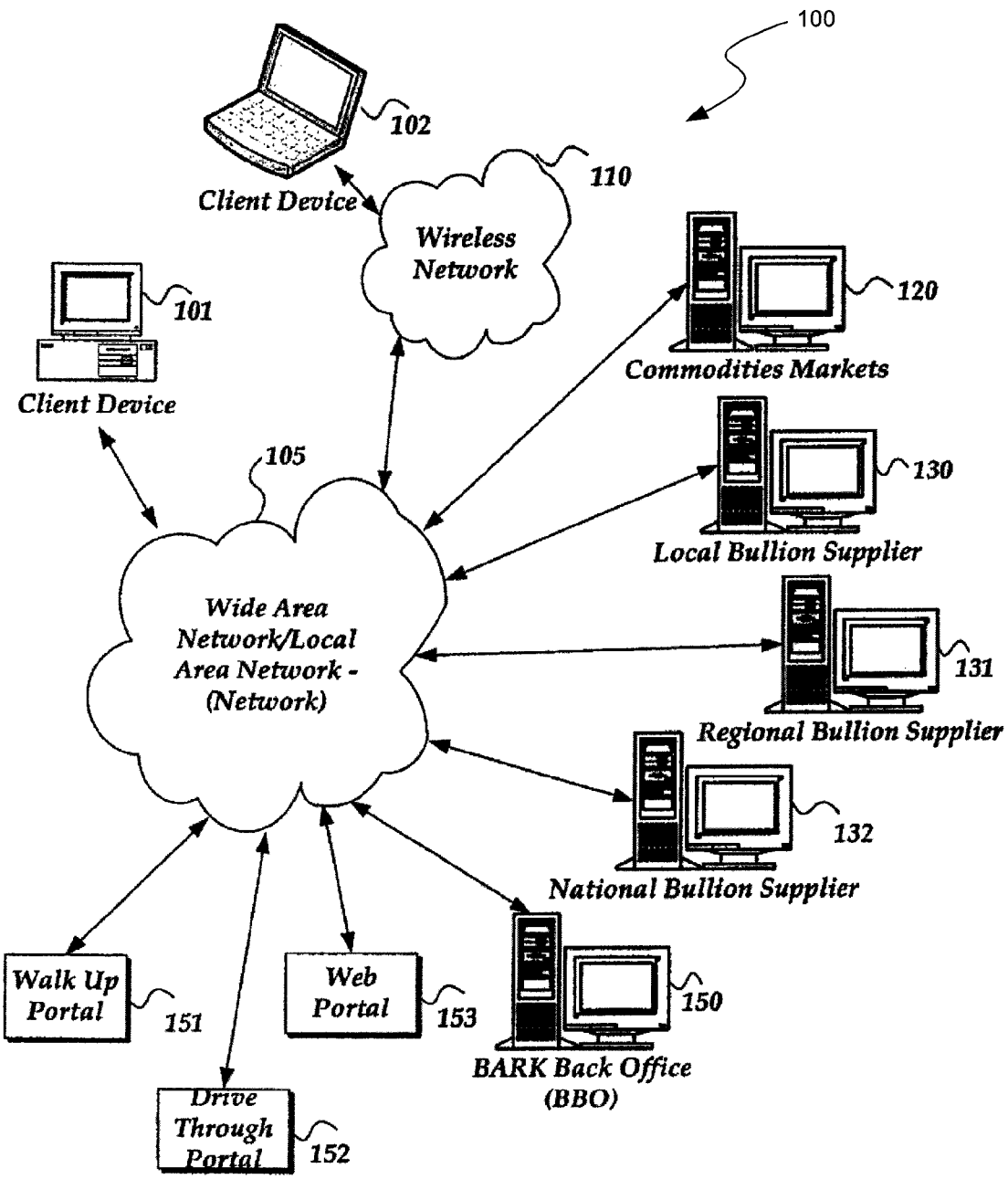
FIG. 1 is a schematic diagram of a system or environment configured in accordance with an embodiment of the invention in which further embodiments of the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "bullion" refers to any form of precious metal (e.g., gold, silver, platinum, palladium, rhodium, etc.) including, but not limited to, ingots, coins, or bars. Precious metals in bulk form are known as bullion, and are typically traded on commodity markets. Bullion metals may be cast into ingots, bars, or minted as coins. Often, a defining attribute of bullion is that it may be valued based on its mass and purity rather than by a face value, such as money. Thus, a 10-ounce gold bullion bar of at least 0.995 fine purity is often considered as a standard industry unit. Moreover, the term "kiosk" as used herein refers to a consumer or user-operated structure or apparatus that can be positioned in a privately accessible area and/or a publicly accessible area in a retail location that provides access for conducting a transaction without the need for a cashier or human clerk or vendor.

Embodiments of the present disclosure are directed generally towards a retail purchase or sales system that enables a customer to purchase or sell gold bullion and/or other precious metal items. These gold bullion or other precious metals can be purchased or sold in various forms, including, for example, bullion coins or bullion ingots of various denominations. The system monitors national and international spot pricing of the retail goods available for sale or purchase within a kiosk portal device for the purpose of establishing a real time spot market pricing for the goods adjusted with a buy or sell premium of a predetermined percentage added to the transaction. While transacting a purchase or sale, and while monitoring current real time spot pricing, the system can also simultaneously hedge a sale or purchase on a real time basis by issuing a market order via a network connection to either buy, or sell, bullion in a same quantity matching the current transaction. In one embodiment, the system operates on a cash basis without membership or identification required as a prerequisite. Buy/sell transactions can be made instantaneously with immediate payment received or issued in U.S. dollars. In another embodiment, the system may conduct transactions utilizing established credit cards, debit cards or bank checks, in which case a purchase of bullion product would be charged to the customer's account, while the sale of a bullion product would be credited to the customer's account. Additionally, remote access to a national network of kiosk portal devices is provided to a consumer that wishes to conduct business within the privacy of their own home, or work place. The consumer may do so by simply logging onto a website, conducting the buy/sell transaction in private, printing a barcode verifying the transaction and choosing which kiosk portal device he wishes to use in order to retrieve his bullion purchase the following day. In another embodiment, the consumer may instead receive a confirmation number indicating the purchase is confirmed. The consumer may then enter the confirmation number at a kiosk portal device and receive their bullion. By using a web portal to initially make a transaction, and later use the kiosk portal device to pick up/provide the bullion, the consumer may feel more secure about not carrying currency, which might be of a larger physical bulk size that bullion.

Moreover, consumers may readily make a sale through the kiosk portal device and within a short period of time (minutes, for example) repurchase bullion from the same kiosk portal device where the sold bullion might be available for repurchase. Moreover, in some embodiments the consumer may exchange one amount of bullion for other amounts of bullion along with cash and/or credit for a remaining amount.

Thus, the kiosk portal devices disclosed herein enable the consumer to choose their own buy or sell price by simply studying or otherwise monitoring the real time spot market pricing and by waiting for an appropriate time to make the transaction. In addition, the kiosk portal devices disclosed herein offer to the consumer the ability to buy bullion or other gold or precious metal items and sell back previous purchases at their leisure, with a guarantee of immediate issuance of cash or bullion on the spot at the point of sale.

While embodiments are described based on gold bullion, other precious metals may be employed. Thus, in other embodiments, bullion may include, but not be limited to silver, platinum, or palladium.

Illustrative Operating Environment

FIG. 1 is a schematic diagram of a system 100 configured in accordance with an embodiment of the disclosure. In the illustrated embodiment, the system 100 includes one or more networks 105, such as local area networks ("LANs") and/or wide area networks ("WANs"). The system 100 also includes a wireless network 110, client devices 101, 102, commodities markets 120, bullion suppliers 130, 132 including local bullion supplier 130, regional bullion supplier 131, and national bullion supplier 132. The system 100 further includes a kiosk, such as Bullion Arbitrage Retail Kiosk ("BARK") Back Office ("BBO") 150, a walk-up kiosk or portal 151, a drive through kiosk or portal 152, and a web portal 153.

One embodiment of a client device usable as one of client devices 101, 102 is described in more detail below in conjunction with FIG. 2. Generally, however, client device 102 may include any mobile computing device capable of receiving and sending a message over a network, such as wireless network 110, or the like. Such devices can include, for example, portable devices such as cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client device 101 may include any computing device that typically connects using a wired communications medium such as personal computers, multiprocessor systems, microprocessor-based or programmable consumer electronics, network PCs, or the like. In one embodiment, one or more of client devices 101, 102 may also be configured to operate over a wired and/or a wireless network.

Client devices 101, 102 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101, 102 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101, 102 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device. Although not shown, it should be clear to one of ordinary skill in the art, that a printing device may be coupled to any one or more of client devices 101, 102 to enable a user of the client device to print information, such as a voucher, confirmation number, or other information, including purchase/sell transaction information, or the like.

Client devices 101, 102 may also be configured to communicate a message, such as through email, SMS, MMS, IM, IRC, mIRC, Jabber, or the like, with another computing device. However, the present invention is not limited to these message protocols, and any other message protocol may be employed.

Client devices 101, 102 may further be configured to include a client application that enables the user to log into a user account that may be managed by another computing device, such as BBO 150, or the like. Such user account, for example, may be configured to enable the user to receive emails, send/receive messages, access selected web pages such as might be presented to the client device through web portal 153, or the like. For example, in one embodiment, the client application might include a web browser that enables a user (consumer) to make sales, and/or purchase transactions of gold bullion and/or other precious metals. However, managing of messages or otherwise participating in bullion transactions may also be performed without logging into a user account. In one embodiment, client devices 101, 102 might interact, for example, through web portal 153 with BBO 150 to purchase bullion. The consumer may then receive, based on the transaction, a confirmation number, voucher, or the like, that may then be used in conjunction with various kiosk portal devices, such as walk-up portal 151 and/or drive through portal 152 to obtain purchased bullion.

Wireless network 110 is configured to couple client device 102 with network 105. Wireless network 110 may include any of a variety of wireless sub-networks that may further overlay stand-alone ad-hoc networks, or the like, to provide an infrastructure-oriented connection for client device 102. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client device 101 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include any wireless communication mechanism by which information may travel between client device 102 and another computing device, network, or the like.

Network 105 is configured to couple portals 151-153, BBO 150, bullion suppliers 130-132, commodities markets 120, and client devices 101 with other computing devices, including through wireless network 110 to client device 102. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Commodities markets 120 includes any network device that is configured to enable access to pricing information about various precious metals, including, but not limited to gold, silver, platinum, palladium, or the like. Commodities markets 120 therefore represents national market sources, regional market sources, and/or international market sources for information relating to real-time price quotes for various forms of bullion, including, but not limited to coins, ingots, bars, or the like. The information may be securely streamed to BBO 150 using any of a variety of secure mechanisms, including, but not limited to Transport Layer Security (TLS)/Secure Socket Layer (SSL), virtual private networks (VPN), or the like. The information may be transmitted in at least one embodiment 24 hours per day, seven days per week. However, in some embodiment, selected sources might provide periodic updates of pricing, price information when a price is determined to have changed from a previously sent price, or the like. As noted, the sources of such information might include various commodity market exchanges such as various U.S. sources, Canadian sources, Chinese market sources, South African market sources, Australian market sources, Indian market sources, European market sources, British market sources, Japanese market sources, Swiss market sources, and/or Brazilian market sources.

Devices that may operate as commodities markets 120 include, but are not limited to personal computers, desktop computers, multiprocessor systems, microprocessor-based or programmable consumer electronics, network PCs, servers, network appliances, and the like.

Bullion suppliers 130-132 represent any of a variety of entities usable to provide a resource for bullion in any of a variety of forms. Such bullion suppliers 130-132 may also represent various entities that may purchase bullion. As such, bullion suppliers 130-132 may include banks, government agencies, commodity brokers, dealers, or the like. In one embodiment, such bullion suppliers may further provide and/or otherwise manage a supply of bullion for portal devices such as walk-up portal 151, and/or drive through portal 152 (kiosk portal devices). As illustrated, bullion suppliers 130-132 may operate at various geographical levels, such as local to a particular kiosk portal device location, regional for a geographical grouping of kiosk portal devices, and/or national levels.

In one embodiment, bullion suppliers may employ various network devices in which to enable communications with BBO 150. As such, devices that may operate as bullion suppliers 130-132 include, but are not limited to personal computers, desktop computers, multiprocessor systems, microprocessor-based or programmable consumer electronics, network PCs, servers, network appliances, and the like.

One embodiment of BBO 150 is described in more detail below in conjunction with FIG. 5. Briefly, however, BBO 150 represents any of a variety of network devices that is configured to perform various 'back office' actions for managing the sale and purchase of bullion. Such back office actions, include, but are not limited to receiving pricing quotes from commodities markets 120, managing inventory levels for kiosk devices such as walk-up kiosk portal 151 and drive through kiosk portal 152, provide pricing information to the kiosk devices, and/or to a client device through web portal 153, and the like. BBO 150 may further monitor various activities at a kiosk portal device and/or web portal 153 and provide recommendations about which portal access is popular, at a security risk, is less popular, and the like. BBO 150 may further interact with one or more bullion suppliers 130-132 to provide instructions to provide bullion to a particular kiosk portal device, to relocate a kiosk portal device, or the like. BBO 150 may also manage purchase and/or sell transactions of bullion through bullion suppliers 130-132 using an arbitrage approach. For example, in one embodiment, BBO 150 may perform automated, time of sale, instant hedging through a portal access, wherein an automatic buy, or sell order of a same quantity of bullion might be performed to offset each transaction in 'real-time' as it might be performed with a consumer. Such arbitrage pricing might take advantage of differences between a commodity price quote used to offer a purchase/sell to a consumer, the price accepted by the consumer, and any mark-ups introduced by BBO 150, to determine a price to offer to the bullion supplier 130-132. BBO 150 may employ at least portions of processes described below in conjunction with FIGS. 7 and 8 to perform at least some of its actions.

Devices that may operate as BBO 150 include, but are not limited to personal computers, desktop computers, multiprocessor systems, microprocessor-based or programmable consumer electronics, network PCs, servers, network appliances, and the like.

One embodiment of a kiosk portal device representing walk-up kiosk or portal 151 and/or drive through kiosk or portal 152 is described in more detail below in conjunction with FIG. 4. Briefly, however, walk-up kiosk or portal 151 and drive through kiosk or portal 152 represent any of a variety of kiosk portal devices useable to enable a consumer to approach the portal device to perform purchases and/or sales of bullion, including enabling the consumer to re-purchase, re-sell the same bullion through the same kiosk portal device, and to perform transactions at any time of day. A difference between portal 151 and 152 might include how a consumer approaches the device, such as walking up to the device (portal 151) or driving up to the device (portal 152). In one embodiment, therefore, an arrangement of external features of each device might be different based on various ergonomic aspects, security aspects, or the like. Thus, while FIG. 3, which is described in more detail below, represents one embodiment of a possible interface arrangement of portals 151, 152, the invention is not so limited. For example, a bullion slot and/or dispenser might be configured differently to enable ready access by a consumer residing within a vehicle.

Web portal 153 represents any web interface accessible through a network by client devices 101, 102 to enable a consumer to perform various transactions for bullion. However, in one embodiment, web portal 153 might be constrained such that after a purchase, for example, is made by the consumer, the consumer receives a confirmation number, voucher, or other form of confirmation information useable to then take to one of the kiosk portal devices 151, 152 for pick up for the physical bullion.

Illustrative Client Environment

Figure 2:
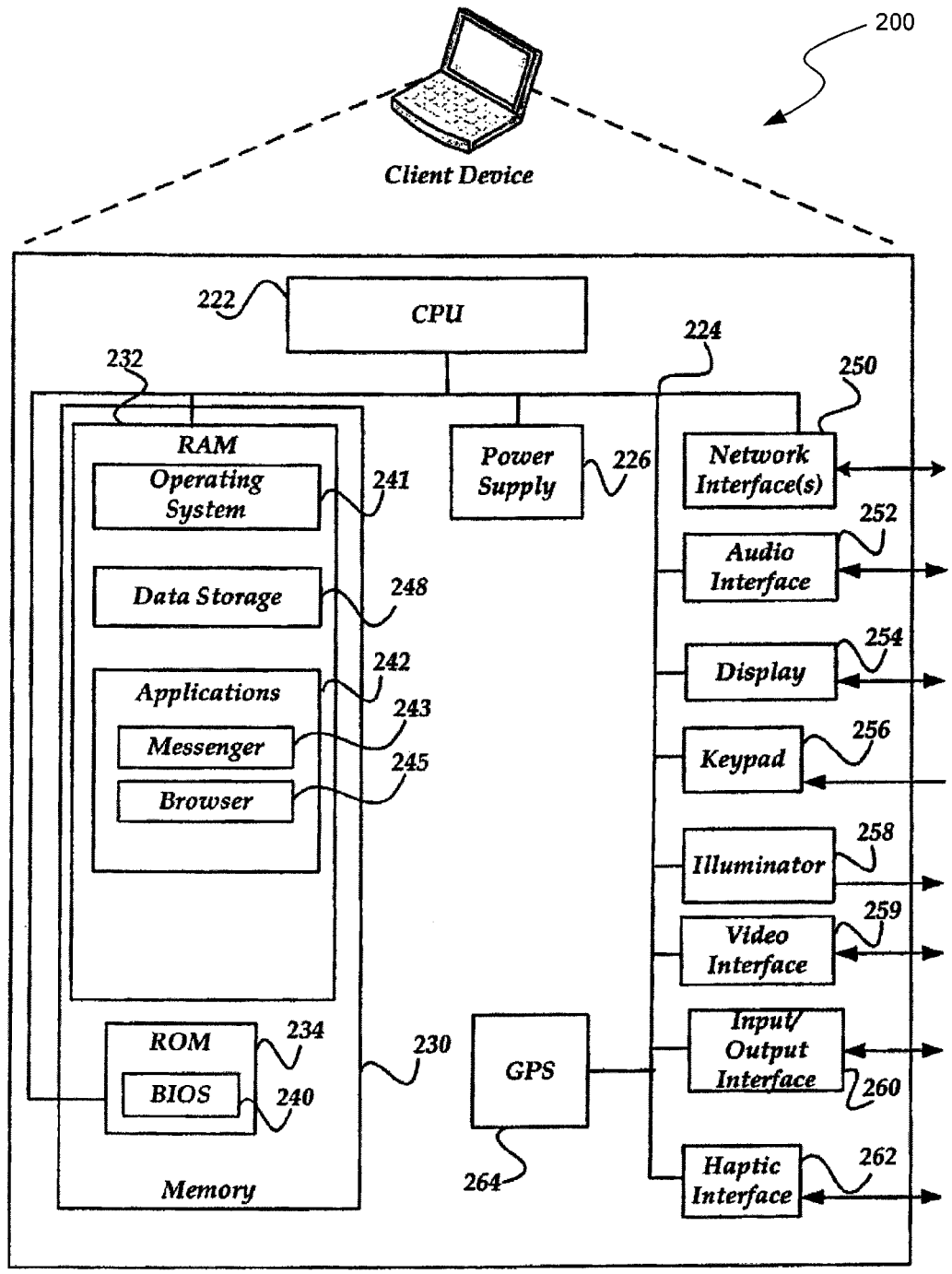
FIG. 2 is a schematic diagram of a client device configured in accordance with an embodiment of the invention.

FIG. 2 is a schematic diagram of a client device 200 configured in accordance with an embodiment of the disclosure and that may be included in a system implementing the invention. Client device 200 may include many more, or less, components than those shown in FIG. 2. However, the components shown are sufficient to disclose an illustrative embodiment for practicing the present invention. Client device 200 may represent, for example, one of client devices 101, 102 of FIG. 1.

As shown in the embodiment illustrated in FIG. 2, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. In addition, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a printer, headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer readable storage media for storage of information such as computer readable instructions, data structures, program modules, or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data. For example, data storage 248 may also be employed to store information that describes various capabilities of client device 200, as well as store an identifier. The information, including the identifier, may then be provided to another device based on any of a variety of events, including being sent as part of a header during a communication, sent upon request, or the like. In one embodiment, the identifier and/or other information about client device 200 might be provided automatically to another networked device, independent of a directed action to do so by a user of client device 200. Thus, in one embodiment, the identifier might be provided over the network transparent to the user.

Moreover, data storage 248 may also be employed to store personal information including but not limited to contact lists, personal preferences, data files, graphs, videos, or the like.

Data storage 248 may further provide storage for user account information useable BBO 150 of FIG. 1, or the like. At least a portion of the stored information may also be stored on a disk drive or other storage medium (not shown) within client device 200.

Applications 242 may include computer executable instructions which, when executed by client device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 242 may include, for example, messenger 243, and browser 245.

Browser 245 may include any client application configured to receive and display graphics, text, multimedia, and the like, employing any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web-based languages may also be employed. In one embodiment, a consumer seeking to purchase and/or sell bullion may employ browser 245 to interact with web portal 153 of FIG. 1.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, gmail, or the like. In another embodiment, messenger 243 may be a client application that is configured to integrate and employ a variety of messaging protocols. In one embodiment, messenger 243 may employ various message boxes or folders to manage and/or store messages. For example, in one embodiment, information about a purchase and/or sale of bullion might be communicated to a consumer using messenger 243.

Illustrative Kiosk Portal Interface

Figure 3:
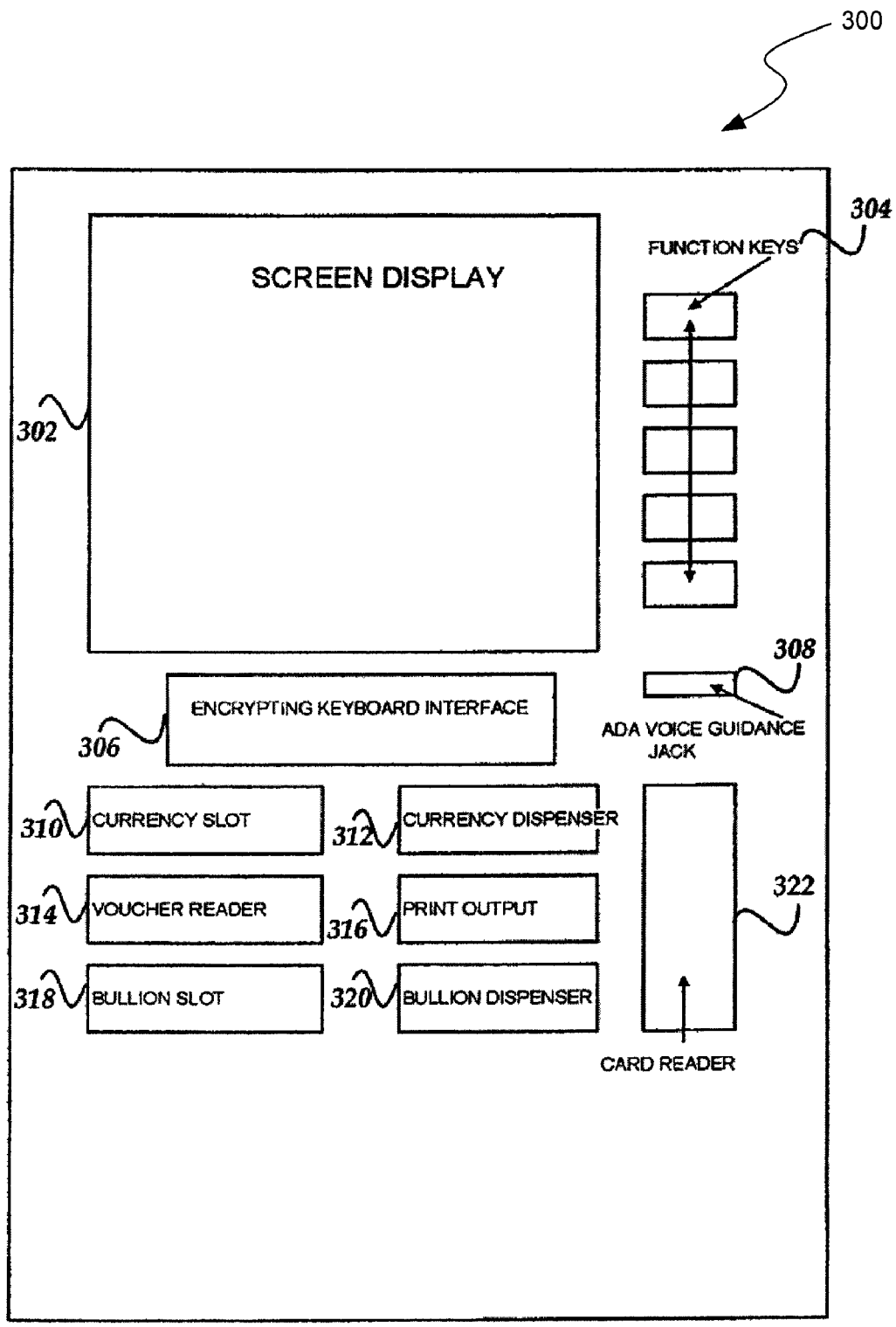
FIG. 3 is a schematic diagram of a screen interface of a kiosk portal device configured in accordance with an embodiment of the invention.

FIG. 3 is a schematic diagram of a screen interface 300 of a kiosk portal device, such as kiosk portal devices 151, 152 of FIG. 1, configured in accordance with an embodiment of the disclosure. Screen interface 300 may include more or less components that those shown. However, the components shown are sufficient to disclose an illustrative embodiment for practicing the invention. It should be noted, further that the invention is not restricted to layout illustrated in FIG. 3, and other arrangements are also envisaged.

In one embodiment, screen interface 300 might be configured to be built into a wall, such as might be seen with a bank ATM device or the like. However, in another embodiment, screen interface 300 might be arranged to provide a consumer interface to a stand-alone physical kiosk device that may be arranged to reside in various locations, such as retail shopping locations (e.g., malls, banks, grocery stores, or the like).

As shown in the illustrated embodiment, screen interface 300 includes screen display 302, function keys 304, keyboard interface 306, American Disabilities Act (ADA) voice guidance interface 308, currency slot 310, currency dispenser 312, voucher reader 314, print output 316, bullion slot 318, bullion dispenser 320, and card reader 322.

Screen display 302 may include any size, type of display screen, including, but not limited to a touch, screen, color screen, or the like. A size and/or shape of screen display 302 may vary from one kiosk portal device to another based on installation constraints, ergonomics, engineering designs, or the like.

Function keys 304 provide various specific actions in response to being depressed, as described in detail below. For example, when a particular page is displayed on screen display 302, one of function keys 304 might enable the consumer to select a language for interacting with the portal device, a type of commodity involved in a transaction, or the like.

Encrypting keyboard interface 306 represents one embodiment of a set of alphanumeric entry keys usable to enter various information in screen interface 300. Encrypting keyboard interface 306 might be configured, in one embodiment, such that information entered might be displayed for a portion of time, and then subsequently encrypted, or otherwise obfuscated, to avoid having the information being observed by another person improperly. In another embodiment, the entry of such information might be obfuscated immediately, thereby, not showing the entered data even to the consumer. In still another embodiment, using encrypting keyboard interface 306, the data may be visible to the consumer through screen display 302 for an extended time period. However, entry of the data might be encrypted internally by screen interface 300, and/or another component of kiosk portal device of FIG. 1, or the like.

Currency slot 310 represents any of a variety of mechanisms usable to receive currency, including paper money and/or coins. Currency dispenser 312 represents any of a variety of mechanisms usable to provide to the consumer currency, including paper money and/or coins. In one embodiment, currency slot 310 and currency dispenser 312 might be integrated into a single mechanism. In another embodiment, currency slot 310 and/or currency dispenser 312 might be arranged for paper currency and not for coins.

Voucher reader 314 may, in one embodiment, be an optional component, that is arranged to receive and authenticate a voucher printed during an interaction with web portal 153 of FIG. 1. In one embodiment, a voucher might include a bar code or other encrypted information that may be read by voucher reader 314 and provide information about a previous transaction that a consumer might wish to continue at a kiosk through screen interface 300.

Print output 316 includes any mechanism usable to print selected information about a bullion transaction. Bullion slot 318 represents any mechanism usable to receive bullion, and enable the bullion be subsequently assayed and/or otherwise authenticated. In one embodiment, such mechanisms include mechanical coin validators, coin comparators, electronic coin validators, or the like. However, bullion slot 318 may further include arrangements for receipt of other forms of bullion, including, but not limited to various forms of coins from various countries, bars, ingots, or the like.

In one embodiment bullion slot 318 is configured and arranged to minimize likelihood of tampering to access bullion from within the kiosk portal device. Such mechanisms might include various doors, angles of entry, or the like, as well, as electronics. Moreover, in one embodiment, when it is determined that bullion that is provided into bullion slot 318 is determined to not be authentic, the rejected bullion might also be returned through bullion slot 318. However, in another embodiment, the rejected bullion might, instead be returned via bullion dispenser 320.

Bullion dispenser 320 includes any mechanism useable for securely providing a specified amount and/or form of bullion to the consumer in a manner that minimizes a likelihood of access to other bullion within the kiosk portal device. In one embodiment, doors, angles of exit, electronic sensors, and the like, might be employed. In one embodiment, a tray device might be employed to ease access to the dispensed bullion by a consumer within a vehicle.

Card reader 322 represents any mechanism usable to read a credit card, or the like.

Illustrative Kiosk Portal Device Environment

Figure 4:
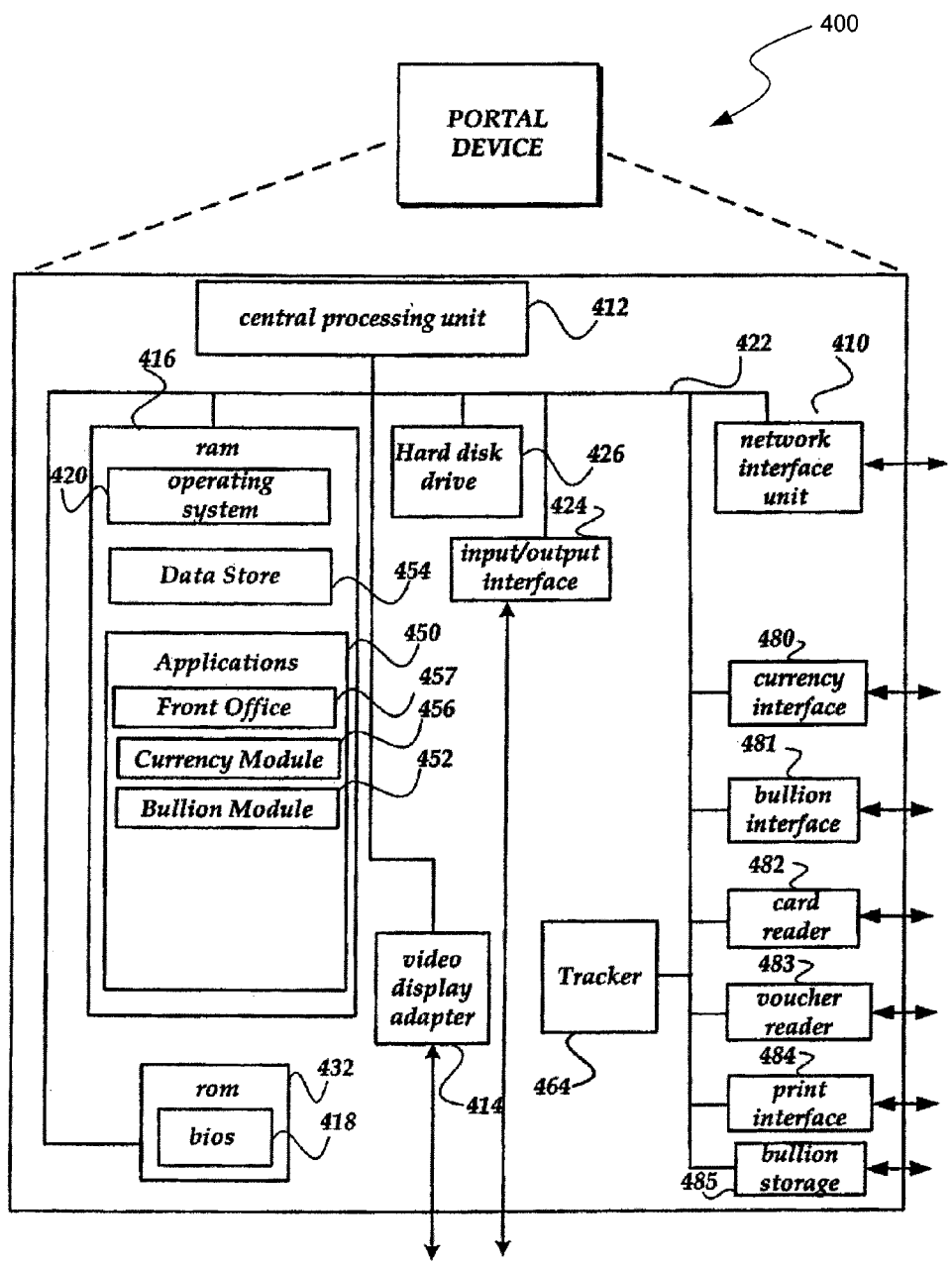
FIG. 4 is a schematic diagram of a kiosk portal device configured in accordance with an embodiment of the invention.

FIG. 4 is a schematic diagram of a kiosk portal device 400 configured in accordance with an embodiment of the disclosure and that may be useable in conjunction with screen interface 300 of FIG. 3. Portal device 400 may include many more components than those shown. The components shown, however, are sufficient to disclose an illustrative embodiment for practicing the invention. Portal device 400 may represent, for example, walk, up portal device 151 and/or drive through portal device 152 of FIG. 1.

Portal device 400 includes processing unit 412, video display adapter 414, and a mass memory, all in communication with each other via bus 422. The mass memory generally includes RAM 416, ROM 432, and one or more permanent mass storage devices, such as hard disk drive 426, tape drive, optical drive, and/or floppy disk drive. The mass memory stores operating system 420 for controlling the operation of portal device 400. Any general purpose operating system may be employed. Basic input/output system ("BIOS") 418 is also provided for controlling the low level operation of portal device 400. As shown in the embodiment illustrated in FIG. 4, portal device 400 also can communicate with the Internet, or some other communications network, via network interface unit 410, which is constructed for use with various communication protocols including the TCP/IP protocol. Network interface unit 410 is sometimes known as a transceiver, transceiving device, or network interface card (NIC).

The mass memory as described above illustrates another type of computer readable media, namely computer storage media. Computer-readable storage media may include volatile, nonvolatile, removable, and non removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

The mass memory also stores program code and data. For example, mass memory might include data store 454. Data store 454 may be include any mechanism usable for store and managing data, including but not limited to a file, a folder, a document, or an application, such as a database, spreadsheet, or the like. Data store 454 may manage information that might include, but is not limited to screen interface displays, accounts, account access information, or the like, as well as scripts, applications, applets, and the like.

One or more applications 450 may be loaded into mass memory and run on operating system 420. Examples of application programs may include transcoders, schedulers, calendars, database programs, word processing programs, HTTP programs, customizable user interface programs, IPSec applications, encryption programs, security programs, VPN programs, account management, and so forth. Applications 450 may include front office 457, currency module 456, and bullion module 452.

Front office 457 is configured to manage the device interactions with a consumer for the purchase and/or sale of bullion. Front office 457 may provide various screen displays for use in enabling a consumer to purchase and/or sale bullion. One embodiment of a flow for such interactions is described below in more detail with reference to FIG. 9.

Front office 457 may receive information from BBO 150 of FIG. 1 that may include one or more price quotes usable for display to a consumer. Front office 457 may further modify the price based on a bullion inventory for portal device 400. In another embodiment, front office 457 may provide bullion inventory information to BBO 150 such that BBO 150 may modify price quotes based on bullion inventory. Front office may further interact with currency module 456 and/or bullion module 452 to confirm receipt/distribution of currency and/or bullion. Front office 457 may further interact with other components of portal device 400 to manage other aspects, including printing of receipts and/or other information, managing storage information for bullion, including providing inventory information, and the like, validating/authenticating information from a credit card, including providing information to BBO 150 for use in validating/authenticating information from the credit card, and the like.

Thus, front office 457 and/or currency module 456 and/or bullion module 452 may interact with currency interface 480 for managing receipt of and/or distribution of currency; bullion interface 481 for managing the receipt of/authentication/assaying of, and/or dispensing of bullion; card reader 482 for reading and authenticating requests for bullion transactions; reading/validating vouchers through voucher reader 483; and the like. Bullion storage 485 includes a variety of mechanisms arranged to store received and/or dispense bullion. One embodiment of a bullion interface 481 and bullion storage 485 is described in more detail below with reference to FIG. 6.

Tracker 464 includes any mechanism useable to detect tampering of portal device 400 including improper movement of portal device 400. In one embodiment, tracker 464 may be configured with various motion sensors, sensors to detect prying of doors or other improper tampering. In one embodiment tracker 464 may include sensors to detect if portal device 400 is moved from a first geophysical location to a second geophysical location. In another embodiment, tracker 464 might include a location detector, such as a GPS or the like that provides location information of portal device 400. Based on detected movement and/or other tampering data, tracker 464 may be configured to send such tampering/movement/location information to BBO 150 of FIG. 1. In one embodiment, such information might be transmitted over a wireless and/or wired network such as described above in conjunction with FIG. 1.

Illustrative BARK Back Office Environment

Figure 5:
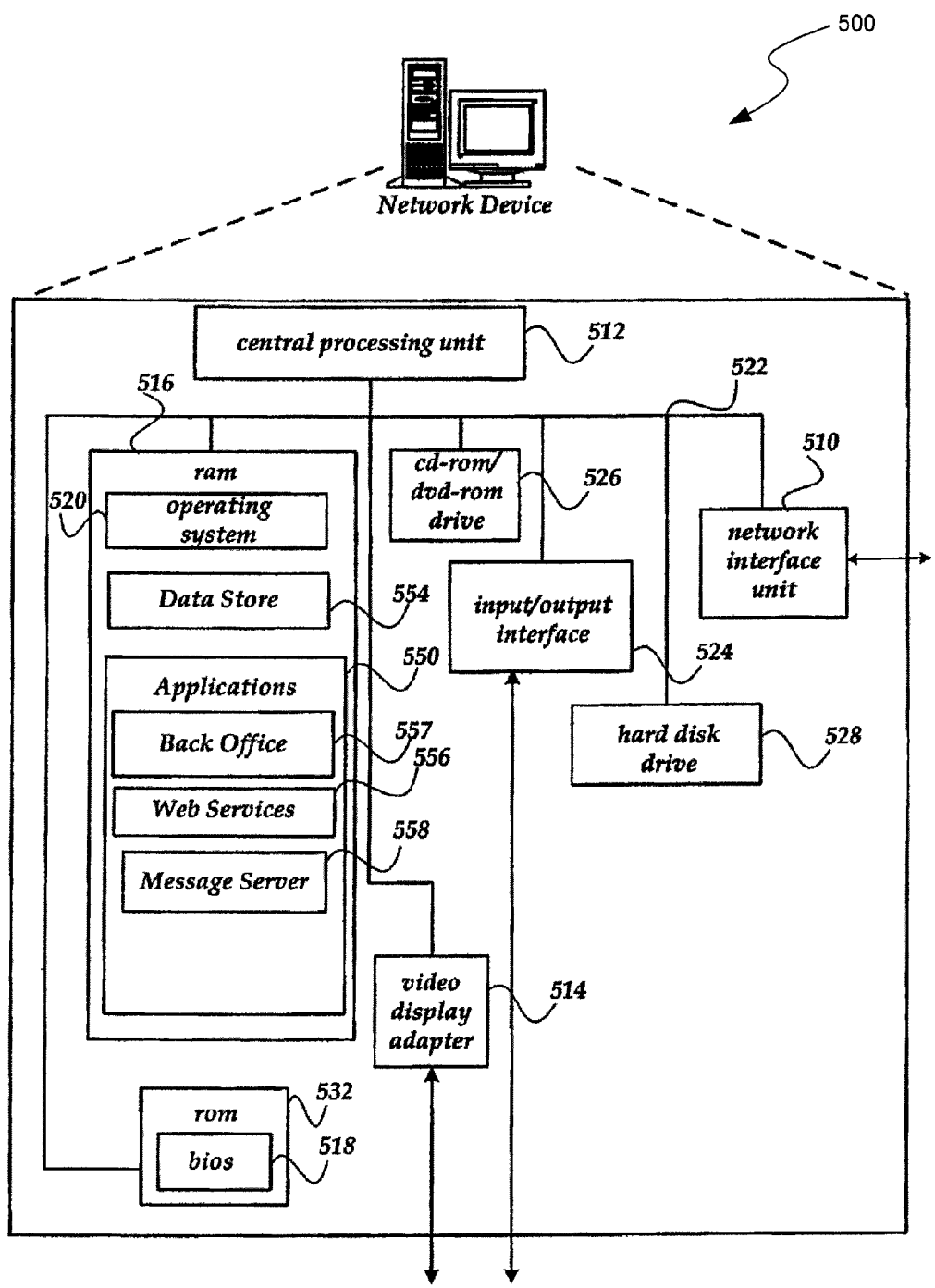
FIG. 5 is a schematic diagram of a network device or a bullion arbitrage retail kiosk ("BARK") back office network device configured in accordance with an embodiment of the invention.

FIG. 5 is a schematic diagram of a network device 550 configured in accordance with an embodiment of the disclosure. Network device 500 may include many more components than those shown. The components shown, however, are sufficient to disclose an illustrative embodiment for practicing the invention. Network device 500 may represent, for example, BBO 150 of FIG. 1.

Network device 500 includes processing unit 512, video display adapter 514, and a mass memory, all in communication with each other via bus 522. The mass memory generally includes RAM 516, ROM 532, and one or more permanent mass storage devices, such as hard disk drive 528, tape drive, optical drive, and/or floppy disk drive. The mass memory stores operating system 520 for controlling the operation of network device 500. Any general purpose operating system may be employed. Basic input/output system ("BIOS") 518 is also provided for controlling the low level operation of network device 500. As shown in the embodiment illustrated in FIG. 5, network device 500 also can communicate with the Internet, or some other communications network, via network interface unit 510, which is constructed for use with various communication protocols including the TCP/IP protocol. Network interface unit 510 is sometimes known as a transceiver, transceiving device, or network interface card (NIC).

The mass memory as described above illustrates another type of computer readable media, namely computer storage media. Computer-readable storage media may include volatile, nonvolatile, removable, and non removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

The mass memory also stores program code and data. For example, mass memory might include data store 554. Data store 554 may be include any mechanism usable for store and managing data, including but not limited to a file, a folder, a document, or an application, such as a database, spreadsheet, or the like. Data store 554 may manage information that might include, but is not limited to web pages, accounts, account access information, information from various market sources, information about various kiosk portal devices, including inventory information, or the like, as well as scripts, applications, applets, and the like.

One or more applications 550 may be loaded into mass memory and run on operating system 520. Examples of application programs may include transcoders, schedulers, calendars, database programs, word processing programs, HTTP programs, customizable user interface programs, IPSec applications, encryption programs, security programs, VPN programs, web servers, account management, and so forth. Applications 550 may include web services 556, Message Server (MS) 558, and back office 557.

Web services 556 represent any of a variety of services that are configured to provide content, including messages, over a network to another computing device. Thus, web services 556 include for example, a web server, messaging server, a File Transfer Protocol (FTP) server, a database server, a content server, or the like. Web services 556 may provide the content including messages over the network using any of a variety of formats, including, but not limited to WAP, HDML, WML, SMGL, HTML, XML, cHTML, xHTML, or the like. Web services 556 may be configured to provide a consumer interface such as web portal 153 of FIG. 1 for use in enabling a consumer to manage bullion transactions over a network.

Message server 558 may include any computing component or components configured and arranged to forward messages from message user agents, and/or other message servers, or to deliver messages to a local message store, such as data store 554, or the like. Thus, message server 558 may include a message transfer manager to communicate a message employing any of a variety of email protocols, including, but not limited to, Simple Mail Transfer Protocol (SMTP), Post Office Protocol (POP), Internet Message Access Protocol (IMAP), NNTP, or the like. However, message server 558 is not constrained to email messages, and other messaging protocols may be managed by one or more components of message server 558. Thus, message server 558 may also be configured to manage SMS messages, IM, MMS, IRC, mIRC, or any of a variety of other message types.

Back office 557 is configured to manage receiving price quotes, determine real-time prices based on a combination of the quotes. In one embodiment, back office 557 may determine the pricing for bullion based on inventory information from one or more kiosk portal devices. Back office 557 may further manage and record purchase sale information about bullion, and manage inventory acquisition for various kiosk portal devices based on an arbitrage mechanism. Back office 557 may perform at least some of its actions using portions of the processes described below in more detail below with reference to FIGS. 7 and 8.

Illustrative Bullion Supply Environment

Figure 6:
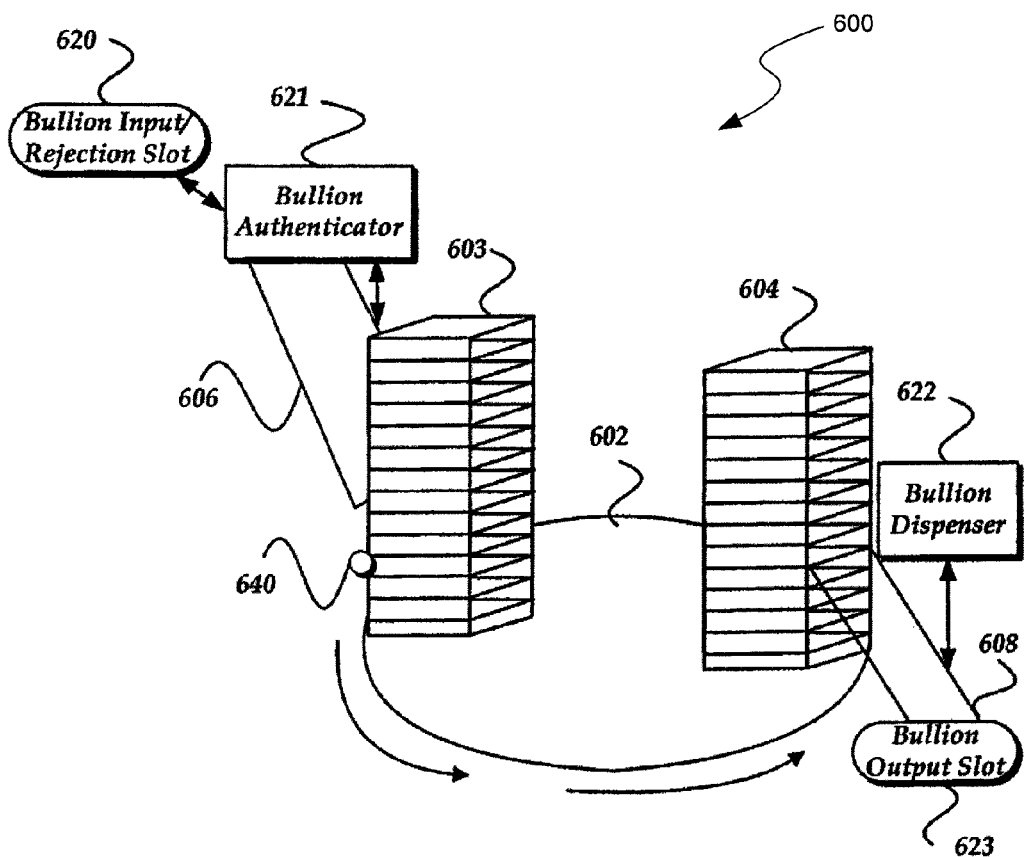
FIG. 6 is a schematic diagram of a bullion management mechanism configured in accordance with an embodiment of the invention for use within a kiosk portal device.

FIG. 6 is a schematic diagram of a bullion management mechanism configured in accordance with an embodiment of the disclosure and for use within a kiosk portal device such as portal device 400 of FIG. 4. In one embodiment, mechanism 600 represents various components of portal device 400 shown in FIG. 4, including, for example, bullion storage 485 and bullion interface 481. With reference to FIG. 6, however, it should be noted that mechanism 600 represents one possible arrangement of components and that the invention is not limited to this arrangement. Thus, other storage mechanism, assaying mechanisms, or the like, may also be used, without departing from the scope of the invention. Mechanism 600 may include many more or less components than those shown in FIG. 6. However, the components shown are sufficient to disclose one embodiment for practicing the invention.

As shown in the embodiment illustrated in FIG. 6, mechanism 600 includes bullion input/rejection slot 620, bullion authenticator 621, delivery ramp 606, bullion carousal 602 with bullion storage stacks 603, 604, bullion dispenser 622, bullion dispensing ramp 608, and bullion output slot 623.

Bullion of various quantities, shapes, denominations, or the like, may be received at bullion input/rejection slot 620, where the bullion may be assayed and/or otherwise authenticated by bullion authenticator 621. Briefly, bullion authenticator 621 may employ any of a variety of authentication mechanisms including but not limited to assaying a type of bullion, a weight, a shape, a size, or the like. In one embodiment, electronic imaging might be employed to detect information on the bullion, similar to facial recognition analysis. Such information may be used to authenticate the bullion. However, other mechanisms may also be used including mechanisms that examine a diameter, thickness, magnetic content, weight, or other characteristics of the bullion. Another embodiment may include optics to gather data about the bullion to validate the bullion. In still another mechanism, a technology similar to oscillating fields may be used, where the bullion passes between a pair of coils. One coil may transmit a magnet field, as the bullion passes through the magnetic field, the field is altered. The alteration may then be analyzed to determine differences in size, width, shape, and/or metal content of the bullion. However, the invention is not limited to these mechanisms, and others may also be employed.

If the bullion is not authentic it may be rejected through bullion input/rejection slot 620. Otherwise, authenticated bullion may move down delivery ramp 606 to a specified tray/location within one or more bullion storage stacks 603, 604. In one embodiment, bullion storage stacks 603, 604 may be located on bullion carousal 602 such that the carousal 602 may rotate to provide a specified bullion storage stack 603, 604 for receipt of the incoming bullion. In this manner, various types and/or amounts of bullion may be sorted within the stacks. Similarly, when bullion is to be dispensed, bullion carousal 602 may rotate such that an appropriate type or amount of bullion may be located proximate to dispensing ramp 608. Bullion dispenser 622 may then mange dispensing ramp 608 and/or the rotation such that a properly selected bullion may be delivered through bullion output slot 623 to the consumer.

In one embodiment bullion storage stacks 603, 604 may include various sensing devices 640 usable to enable management of inventory. Thus, sensing devices 640 might include electronic and/or mechanical mechanisms to determine how much and/or of what type of inventory is within a kiosk portal device.

Generalized Operation

Figure 7:
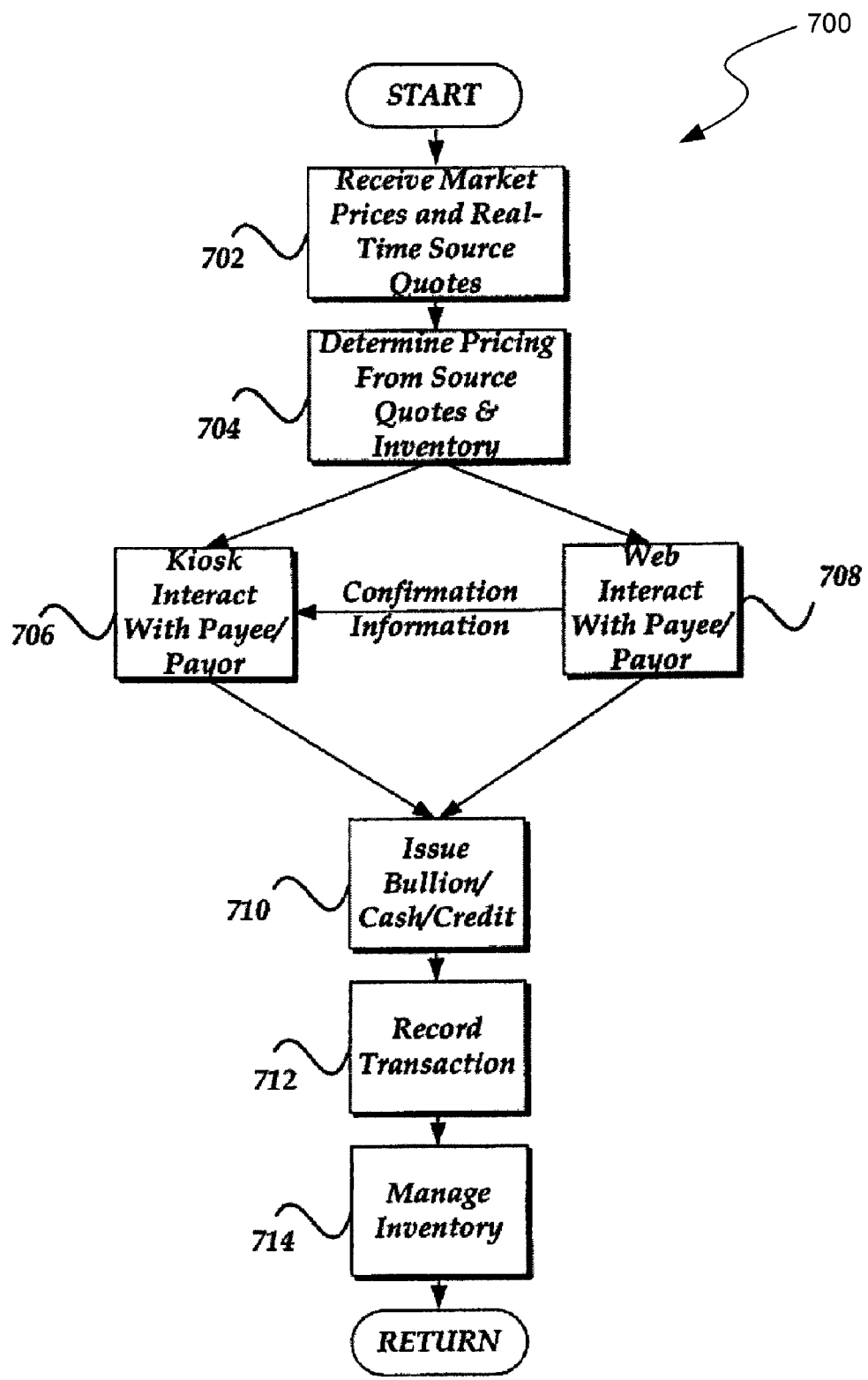
FIG. 7 is a flow diagram of a process configured in accordance with an embodiment of the invention for managing purchase/sell transactions of bullion.

The operation of certain aspects of the invention will now be described with respect to FIGS. 7-9. FIG. 7 is a flow diagram of a process 700 configured in accordance with an embodiment of the disclosure for managing purchase/sell transactions of bullion. Process 700 of FIG. 7 may be implemented, in one embodiment, within BBO 150 and/or one or more of kiosk portal devices 151, 152 of FIG. 1.

Process 700 begins after a start block at block 702, where various market prices and real-time source quotes are received. In one embodiment, the market price quotes are received from a various local, national, and/or international sources. Processing then flows to block 704, where pricing is determined based at least in part on the received source quotes and/or portal device inventory. In one embodiment, block 704 may employ a process such as described in more detail below, in part, by process 800 of FIG. 8 to determine a price, such as a bullion transaction price to buy or sell bullion at the kiosk.

Processing then flows to block 706 and/or block 708 based on a consumer's preference or action to participate in bullion transactions. For example, in one embodiment, block 708 may represent that the consumer performs bullion transactions using a web portal such as described above. Upon completion of transaction, the consumer might receive a voucher, confirmation number, or other confirmation information that may then be presented at a kiosk portal device for use in accessing purchased bullion. Thus, in one embodiment, processing may flow from block 708 to block 706. However, processing may also flow from block 708 to block 710, where the consumer might continue other actions.

At block 706, the consumer may perform various interactions with the kiosk portal device to purchase bullion from the kiosk portal device and/or sell bullion to the kiosk portal device. In one embodiment, the consumer may select to perform both a purchase and a sale of bullion, such that in at least one embodiment, the portal device may be used to buy/sell and later sell/buy the same bullion through the kiosk portal device. In one embodiment, the consumer may elect to swap or otherwise exchange one type and/or amount of bullion for another type and/or amount of bullion and/or cash/credit. For example, using kiosk portal device, the consumer might seek to exchange U.S. bullion for Canadian bullion, or the like. Similarly, the consumer might select to sell/buy a selected amount of bullion in exchange for a small amount of bullion in combination with cash/credit. Furthermore, in still another embodiment, the consumer might be able to exchange one bullion type for another, such as gold for silver, or platinum, palladium, rhodium, or the like. Thus, the invention provides the consumer with a variety of different approaches for managing their bullion wealth. For example, in one embodiment, a cash transaction, the consumer might not provide any form of customer identification during the transaction. Thus, relative anonymity may be maintained during the transaction.

Moreover, because kiosk portal devices may be located in a variety of different locations and optionally available 24 hours per day, the consumer is not constrained to a particular time for performing their transactions. Transactions on a buy side may be precise, and immediate with no waiting period for good funds to be established before bullion is delivered to the consumer. Transactions on a sell side are similarly precise, and immediate without a waiting period for external commodity assay to be performed before funds are delivered to the consumers.

Processing moves to block 710, where such transactions are performed. Processing flows to block 712, where various information may be recorded for the transaction, including, for example, what was exchanged, how much, and the like. Processing continues to block 714, where inventory for the kiosk portal device may be analyzed to determine whether to buy/sell inventory as a hedge against the most recent transaction. Processing then returns to a calling process to perform other actions.

Figure 8:
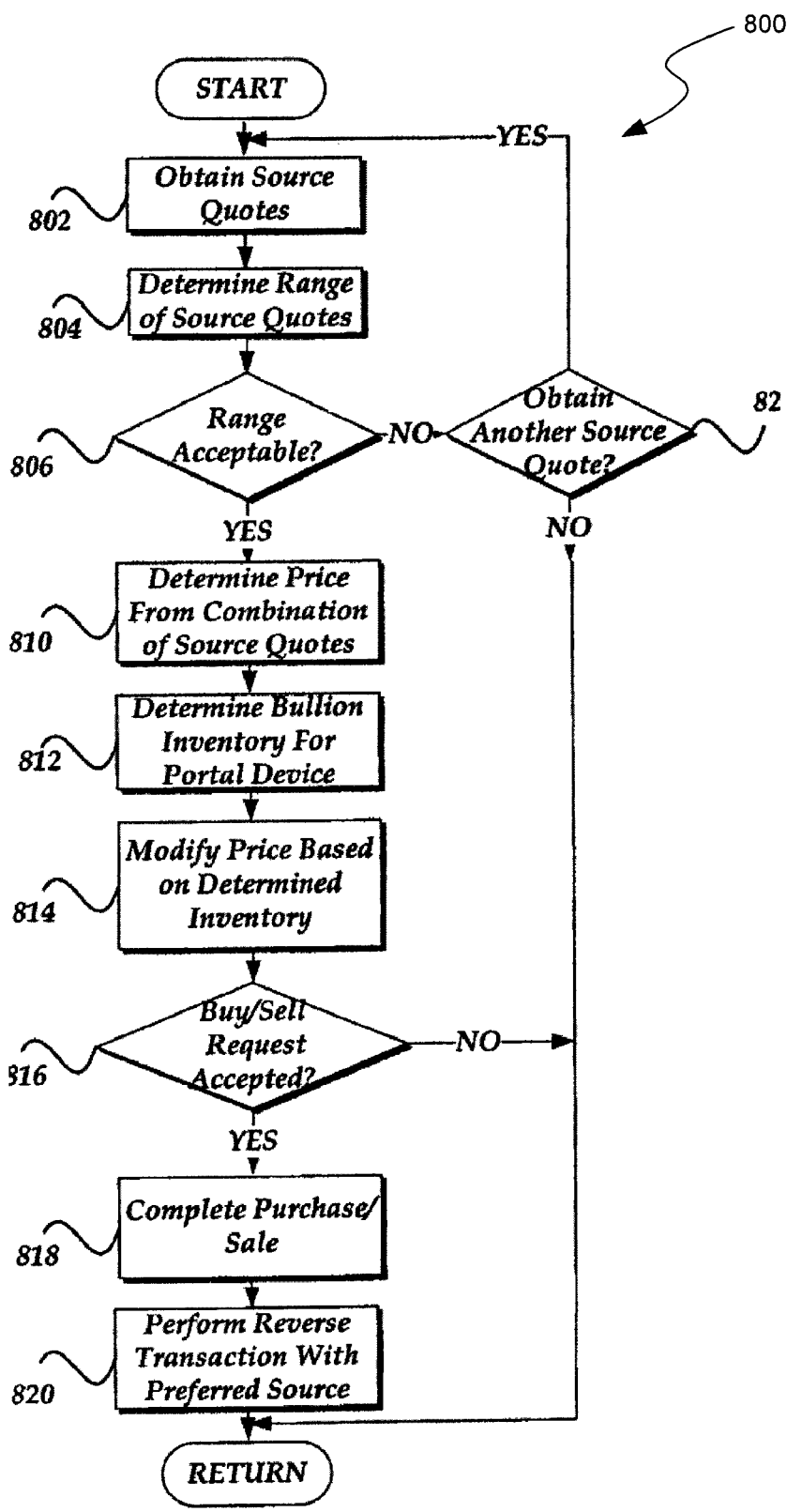
FIG. 8 is a flow diagram a process configured in accordance with an embodiment of the invention for managing arbitrage pricing.

FIG. 8 is a flow diagram of a process 800 configured in accordance with an embodiment of the disclosure for managing arbitrage pricing using a plurality of market quotes, and device inventory. Process 800 begins after a start block at block 802, where various quotes for bullion are received. In one embodiment, the quotes may be specific to a type of bullion. In another embodiment, the quotes may be converted to a particular normalized unit of measurement, such as USD, or the like. Processing flows next to block 804, where a range of the quotes is determined. In one embodiment, it may be desirable to ensure that a range or distribution of the quotes is maintained to enable an acceptable arbitrage spread in pricing to be obtained. Thus, in one embodiment, a range that is determined to exceed about 1% may be desired. However, other ranges might also be desirable; thus, the invention is not limited to this value. For example, the ranges can be greater than 1% or less than 1%. In one embodiment, for example, where two quotes are obtained, if might be desirable to determine whether an absolute value of a difference between the two quotes is equal to or greater than 0.001*a first quote.

Processing flows to decision block 806, where a determination is made whether the range is acceptable. If not, processing flows to decision block 822 to determine whether to seek additional and/or other source quotes. If it is determined to obtain additional and/or other source quotes, processing loops back to block 802. Otherwise, processing may return to a calling process.

If the range is acceptable at decision block 806, processing may continue to block 810, where a price is determined based on a combination of the source quotes. In one embodiment, the price might be based on an average of the source quotes. In other embodiments, however other combinations might also be employed, including a median value, or the like.

Processing flows next to block 812, where a bullion inventory is obtained from one or more kiosk portal devices. In one embodiment, the inventory may then be used at block 814 to adjust the price. For example, if the inventory is determined to be greater than zero but less than say, about 50%, then the price might be adjusted upwards by some percentage, such as $2k*10$, or the like. Where k might be computed as between 0 and 20, in one embodiment. For example, k might be dynamically determined based on an equation, such as $k=(-2/5)$

*inventory percent+20. However, other mechanisms may also be used to adjust the price to increase the price presented to a consumer based on decreasing inventory, when a consumer seeks to conduct a purchase. Similarly, when a consumer seeks to sell bullion, the price may be modified when the inventory is above 50% by decreasing the price using a similar equation. In one embodiment, the price may be further modified to account for a service charge for processing a transaction. For example, the service charge may be based on an amount of the transaction, a quantity of bullion, or a fixed amount.

Processing continues next to decision block 816, where a determination is made whether the transaction is accepted. If not, processing may return to a calling process to perform other actions. Otherwise, processing flows to block 818. At block 818, the consumer purchase and/or sale is transacted. Continuing to block 820, and simultaneous with the conclusion of the aforementioned transaction, a back office reverse transaction is performed for the benefit of the system. An automated, time of sale, instant hedging action may be performed by initiating an automatic buy and/or sell order of the same quantity as the most recent transaction, thereby offsetting each transaction in real-time as it might be made with the consumer. This action is directed towards guaranteeing a predetermined premium yield for each transaction without the risk of an adverse market movement in pricing over time. Thus, in one embodiment, a lowest source quote might be employed to perform a reverse transaction, with the associated market source. Processing then returns to a calling process to perform other actions.

Figure 9:
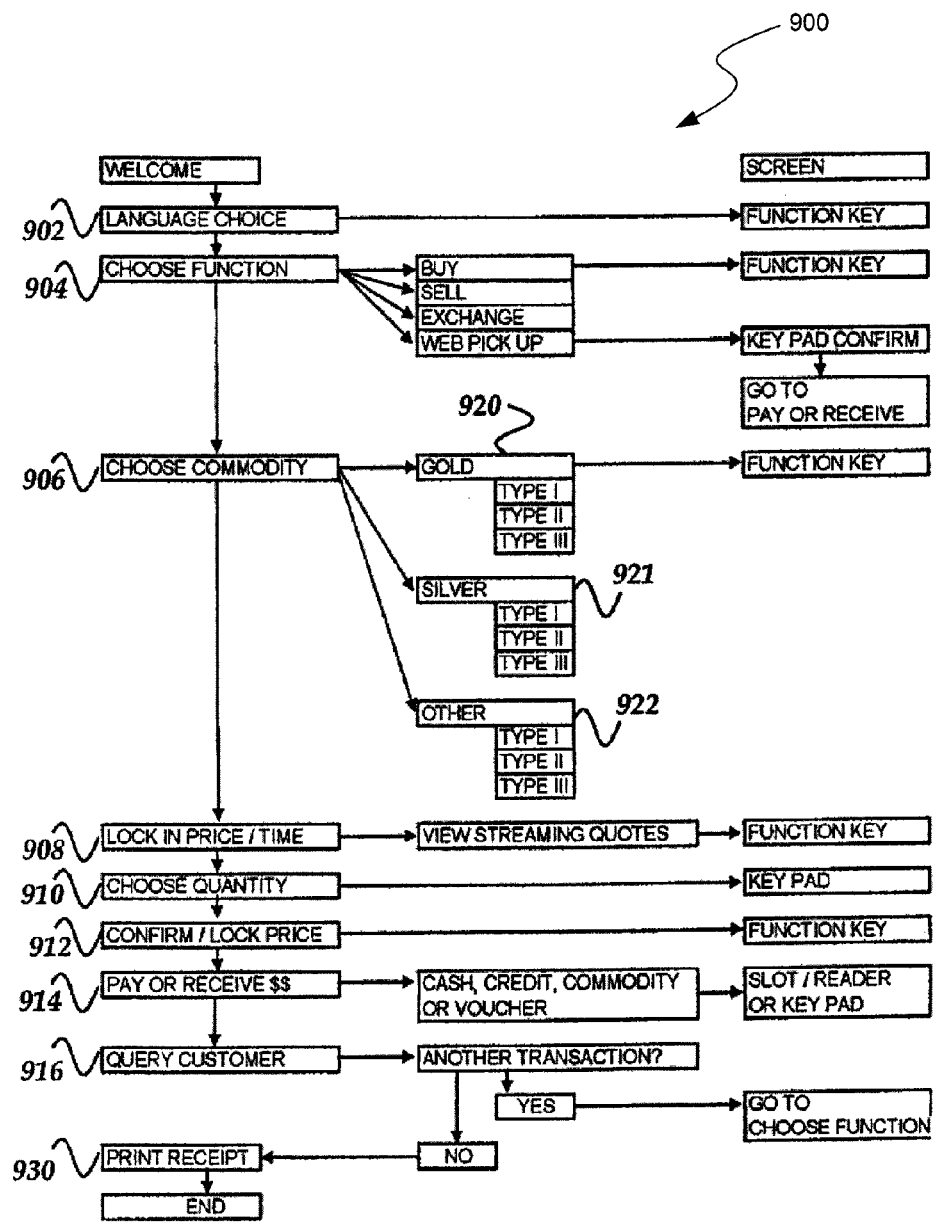
FIG. 9 is a schematic diagram of a kiosk portal device screen interface flow configured in accordance with an embodiment of the invention for managing bullion transactions.

FIG. 9 is a schematic diagram of a kiosk portal device screen interface flow or process 900 configured in accordance with an embodiment of the disclosure for managing bullion transactions. Process 900 of FIG. 9 may be implemented through front office 457 of FIG. 4 and displayed via screen interface 300 of FIG. 3. Process 900 may include more or less options, selections, and/or flows other than shown in FIG. 9. However, those that are shown are sufficient to illustrate one embodiment of the invention. Processing might commence at a welcome page, where one or more possible selections might be available. For example, in one embodiment, the consumer might be presented with a screen display providing selections for various language choices 902. In one embodiment, function keys may be used to select the language. However, it should be noted that the invention is not so constrained, and other mechanisms may also be used, including, typing in a code for the language, or even using a touch screen.

Processing may flow next to provide a screen display that provides for the consumer to choose a function 904. Such functions may include, but are not limited to buy, sell, exchange, and/or web pick up. Again, the consumer may use any of a variety of interface mechanisms to select the function. Moving to the next screen display, the consumer is enabled to choose a commodity 906, which may include gold 920, silver 921, or other 922. Each of these choices may include various types, including, coins, bars, ingots, or the like. In one embodiment, further selections may be made to select a type of coin, an amount, a country of origin of the bullion, or the like.

Moving to the next screen display, the consumer is next enabled to lock in a price/time 908. In one embodiment, the consumer might be presented with various streaming quotes for the bullion selected at 906. At any point, the consumer may lock in the price. Processing moves to the next screen display where the consumer may choose quantity 910. In one embodiment, various predefined amount selections may be displayed. In another embodiment, the consumer might employ touch-screen, keypad, or the like, to enter a quantity for the transaction.

Continuing, the consumer may then be presented with a screen display that enables the consumer to confirm/lock a price 912. The consumer may next pay or receive payment based on the type of transaction 914. In one embodiment, the consumer might specify how to receive the bullion, and/or payment, including cash, credit, commodity, and/or voucher.

Moving next to another screen display, the consumer may be queried 916 as to whether to perform another transaction. Based on the selection by the consumer, the screens may transition to enable selection of another function 904, print a receipt 930, and/or terminate.

It will be understood that each block of the flowchart illustration, and combinations of blocks in the flowchart illustration, can be implemented by computer program instructions. These program instructions may be stored on a computer readable medium and provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems that perform the specified actions or steps, or combinations of special purpose hardware and computer instructions.

Embodiments of the consumer-operated bullion arbitrage retail kiosks disclosed herein include several unique features and advantages. For example, embodiments disclosed herein provide for an automated, point of sale identification, assessment, and authenticity of inventory either as a sale of inventory (working stock), or as a purchase of inventory (working stock). Moreover, consumers or users can purchase or sell bullion at their convenience and/or to take advantage of market value changes in the price of the bullion (e.g., whenever during the day or night such changes might occur). In addition, the kiosks and systems disclosed herein provide reliability in the timely deliverance of the purchase and also provide consistency in pricing that can be assured without negotiation.

In addition, the embodiments disclosed herein can allow consumers or users to anonymously buy or sell bullion. For example, in certain embodiments users can perform transactions without providing customer identification. Embodiments disclosed herein can provide further arbitrage advantages including an automated, time of sale, instant hedging through the integrated portal network wherein the merchant's back office software places an automatic buy, or sell, order of the same quantity thereby offsetting each transaction in "real time" as it is made with the customer. Furthermore, the customer has a choice by which he may choose to exchange a certain denomination of bullion value received for an equivalent value, but in a differing denomination combination of the same bullion. For example, illustratively a consumer can exchange a one ounce bullion coin for two one-half ounce coins. Another advantage is that the consumer has a choice of swapping or otherwise changing one type of bullion for another type of bullion (i.e., silver, gold, platinum, palladium, rhodium, etc.). Additionally, the systems disclosed herein have the ability to buy and later sell the very same coin or other bullion through the BARK systems.

According to further features of the embodiments disclosed herein, transactions at the kiosks on the buy side are precise and immediate with no waiting period for good funds to be established before bullion is delivered to the customer. Moreover, transactions at the kiosks on the sell side are also precise and immediate with no waiting period for an external commodity assay to be performed before funds are delivered to the customer. In addition, the kiosks disclosed herein are unique in that they are able to purchase their own inventory (working stock) for future resale, allowing the device to sell inventory that is not stocked into the device by an outside provider. Rather, the kiosks disclosed herein can be configured to manage the corresponding kiosk inventory by an intelligent inventory procurement capability at each location.

From the foregoing, it will be appreciated that specific embodiments of the invention have been described herein for purposes of illustration, but that various modifications may be made without deviating from the spirit and scope of the various embodiments of the disclosure. Further, while various advantages associated with certain embodiments of the disclosure have been described above in the context of those embodiments, other embodiments may also exhibit such advantages, and not all embodiments need necessarily exhibit such advantages to fall within the scope of the disclosure.

We claim:

1. A method of managing gold bullion transactions at a consumer operated kiosk, the method comprising: receiving, at the kiosk, one or more gold bullion market quotes from one or more market sources, wherein the kiosk is a consumer operated kiosk; determining a gold bullion transaction price for buying or selling gold bullion at the kiosk based at least in part on the one or more market quotes and at least in part on an inventory of gold bullion in the kiosk; presenting the transaction price to a customer at the kiosk to buy or sell gold bullion; and receiving from the customer a request to buy or sell gold bullion at the transaction price; wherein when the request is to buy gold bullion from the kiosk, the method further comprises—receiving payment at the kiosk for the transaction price; and dispensing the gold bullion to the customer at the kiosk; and wherein the request is to sell gold bullion to the kiosk the method further comprises—receiving the gold bullion from the customer at the kiosk; determining authenticity of the received gold bullion at the kiosk, and when the received gold bullion is authentic, paying the customer the transaction price; and when the received gold bullion is not authentic, returning the received gold bullion to the customer.

2. The method of claim 1, further comprising reselling the same gold bullion from the kiosk that was sold to the kiosk by the customer.

3. The method of claim 1 wherein when the request is to sell gold bullion to the kiosk the method further comprises remotely purchasing a second amount of gold bullion at a price that is lower than the transaction price.

4. The method of claim 1, further comprising automatically hedging a sale or purchase of gold bullion in a quantity generally matching a quantity of the gold bullion bought by or sold to the customer by monitoring current real time spot pricing and issuing a market order via a network connection for at least one of buying or selling gold bullion in the quantity of the gold bullion bought by or sold to the customer.

5. The method of claim 4 wherein automatically hedging a sale or purchase of gold bullion comprises automatically hedging the sale or purchase simultaneously when the customer buys or sells the gold bullion at the kiosk.

6. The method of claim 1 wherein determining the gold bullion transaction price includes determining the transaction price based at least in part on the market price plus an additional mark-up price of the gold bullion in the kiosk.

7. The method of claim 1, further comprising transmitting a signal to a gold bullion supplier to increase or decrease an inventory of gold bullion in the kiosk.

8. The method of claim 1 wherein paying the customer the transaction price comprises paying the customer at least in part in another form or denomination of bullion.

9. The method of claim 1 wherein paying the customer the transaction price comprises paying the customer in currency.

10. The method of claim 1 wherein paying the customer the transaction price comprises crediting an account of the customer.

11. The method of claim 1 wherein receiving one or more market quotes comprises receiving one or more real-time market quotes for gold bullion.

12. A method of exchanging a precious metal at a kiosk, the method comprising: receiving, at a kiosk, one or more market price quotes for precious metal, wherein the kiosk is a consumer operated kiosk; displaying, at the kiosk, the one or more market price quotes; determining a transaction price to buy or sell the precious metal at the kiosk based at least in part on the one or more market price quotes and at least in part on a precious metal inventory contained in the kiosk; and offering, at the kiosk, to purchase the precious metal from a customer at the transaction price or to sell the precious metal to the customer at the transaction price; wherein the offer to purchase the precious metal at the kiosk is accepted, the method comprises receiving the precious metal from the customer into the kiosk and paying the customer the transaction price; and wherein when the offer to sell the precious metal at the kiosk is accepted, the method comprises receiving payment of the transaction price at the kiosk and dispensing the precious metal to the customer.

13. The method of claim 12 wherein receiving one or more market price quotes comprises receiving one or more real-time market price quotes via a network coupled to the kiosk.

14. The method of claim 12 wherein receiving one or more market quotes comprises receiving one or more market quotes for at least one of gold, silver, platinum, and palladium.

15. The method of claim 12 wherein when the offer to purchase the precious metal at the kiosk is accepted, the method further comprises authenticating the precious metal from the customer at the kiosk and paying the customer the transaction price when the precious metal is authentic.

16. The method of claim 12 receiving one or more market price quotes for precious metal comprises receiving one or more market prices quotes from a first market for a first amount of precious metal, and wherein when the offer to purchase or sell the precious metal at the kiosk is accepted, the method further comprises purchasing or selling a second amount of precious metal in a second market different than the first market.

17. The method of claim 12 wherein the kiosk is a first kiosk, and wherein dispensing the precious metal to the customer comprises dispensing the precious metal to the customer from at least one of the following: the first kiosk and a second kiosk separate from the first kiosk.

18. The method of claim 17 wherein when the offer to sell the precious metal at the kiosk is accepted, the method further comprises:
   dispensing confirmation information from the first kiosk to the customer after receiving payment of the transaction price; and dispensing the precious metal from the second kiosk after receiving the confirmation information at the second kiosk.

19. A kiosk for exchanging gold bullion, the kiosk comprising: a processor configured to determine an offer price to purchase gold bullion from the kiosk, wherein the offer price is based at least in part on a current market value of the gold bullion and at least in part on the inventory of gold bullion in the storage area; a customer interface configured to display the offer price to a customer and to allow the customer to accept to purchase the gold bullion at the kiosk for the offer price; a storage region configured to the store an inventory of gold bullion in the kiosk; a payment region configured to receive payment of the offer price; and a gold bullion dispensing region configured to dispense the gold bullion to the customer.

20. The kiosk of claim 19 wherein the offer price is further based at least in part on a service charge.

21. The kiosk of claim 19, further comprising a network interface device operably coupled to the computing device, wherein the network interface device is configured to receive one or more market value price quotes for the gold bullion.

22. The kiosk of claim 21 wherein the network interface device is further configured to determine an arbitrage amount of gold bullion to purchase remotely from the kiosk in response to an amount of the gold bullion purchased by the customer at the kiosk.

23. The kiosk of claim 19 wherein:
   the offer price is a first offer price and wherein the computing device is further configured to determine a second offer price to sell gold bullion to the kiosk, wherein the second offer price is based at least in part on the current market value of the gold bullion; the customer interface is further configured to present the second offer price to the customer and to allow the customer to accept to sell the gold bullion to the kiosk for the second offer price;
   the kiosk further comprising—a gold bullion input region configured to receive the gold bullion from the customer; and one or more sensors configured to authenticate the received gold bullion, and wherein the payment region is configured to transfer the payment of the second offer price to the customer.

* * * * *

UNITED STATES PATENT AND TRADEMARK OFFICE
CERTIFICATE OF CORRECTION

PATENT NO. : 8,321,330 B2
APPLICATION NO. : 12/858165
DATED : November 27, 2012
INVENTOR(S) : Kerschner et al.

It is certified that error appears in the above-identified patent and that said Letters Patent is hereby corrected as shown below:

In the Claims:

Column 22, Claim 12, line 43, the word --when-- should be inserted between the words "wherein" and "the".

Signed and Sealed this
Twenty-second Day of October, 2013

Teresa Stanek Rea
*Deputy Director of the United States Patent and Trademark Office*